UNITED STATES PATENT OFFICE.

EDMOND LOUIS JOSEPH BONIFACE, OF CHANGY-LES-BOIS, PAR VARENNES, LOIRET, FRANCE.

METHOD OF TRANSFORMING JERUSALEM-ARTICHOKE JUICE INTO LEVULOSE, &c.

SPECIFICATION forming part of Letters Patent No. 307,624, dated November 4, 1884.

Application filed August 26, 1884. (No specimens.)

*To all whom it may concern:*

Be it known that I, EDMOND LOUIS JOSEPH BONIFACE, of Changy-les-Bois, par Varennes, Loiret, France, have invented an Improved Method of Transforming Jerusalem-Artichoke Juice into Levulose and Applying the said Product, of which the following is a full, clear, and exact description.

The root known as "Jerusalem artichoke" (*Helianthus tuberosus*) contains a peculiar juice chemically known as "synanthrose," and also amylaceous substances (inuline) which cannot be submitted to fermentation before their being transformed into levulose. Under several influences these substances may be transformed directly into alcohol; but this transformation is always only partially effected, as essential oils are produced at the same time, whose production is to be avoided. By the application of my method the synanthrose and inuline are thoroughly and rapidly transformed in levulose, which gives, after a complete and rapid fermentation, alcohol of a good quality. By the present method I can obtain a maximum percentage of alcohol almost deprived of essential oils. According to my method the synanthrose and inuline (whatever may be the process employed for extracting them) are mixed with a mineral or an organic acid and submitted to the action of heat. The temperature to the action of which the juice or pulp must be submitted is about 100° centigrade, and I may employ to this end any kind of heating apparatus or agent. The proportion of acid employed varies according to the nature of the Jerusalem artichoke from which the juice or pulp has been obtained, and to the season of the year and the duration of the operation. Nevertheless, this proportion of acid is about from .0005 to .005 of the weight of the juice or pulp under treatment. At all events, I always employ such a proportion of acid that the treated juice needs not to be neutralized by chalk or other alkali before its fermentation. The transformation of the above-mentioned substances into levulose may be effected either at the open air or under pressure. In the latter case the operation is more rapid, and a smaller proportion of acid is to be employed. When the operation has taken place, the juice is transformed merely in a solution of levulose, which may be successfully submitted to fermentation. According to my invention this solution is either distilled, so as to furnish alcohol, or is employed in the manufacture of a beverage analogous to beer.

In order to manufacture levulose sirup, I proceed as follows: The juice containing synanthrose and inuline is transformed into levulose and purified by the ordinary method used in the manufacture of glucose or starch sirups. I thus obtain a levulose sirup, which is a new product of manufacture, which must not be confounded with glucose sirup. Its savor is much more sweet, and, moreover, it does not contain any dextrine and glucose, as the starch-glucose sirup, but only pure levulose.

As above stated, I obtain by the distillation of the pure levulose obtained by my method alcohol deprived of essential oils,' while by simply concentrating and purifying the solution of levulose I obtain levulose sirup, which is of a much higher quality than glucose sirup. This levulose may also be employed in the manufacture of a special kind of beer having all the qualities and savor of ordinary beer. This levulose beer may be obtained at a very low price, and is quite hygienic. For this manufacture I proceed as follows: The Jerusalem-artichoke juice, obtained as pure as possible, is transformed into levulose by the action of an acid at a temperature of about 100° centigrade. In this case an organic acid is employed. The use of a mineral acid is not objectionable when levulose is to be transformed into alcohol; but in the present case such an acid could be dangerous, as it remains mixed with the beer. I then use in the case of the manufacture of levulose beer only organic acids—such as tartaric, oxalic, malic, acetic, or other acids—*i. e.*, the acids which are generally found in pure wines and in fruits, and which are not dangerous and probably useful at a hygienic or digestive point of view. I may also employ carbonic acid under pressure. When so transformed into levulose, the juice is submitted to the ordinary operations of beer manufacture, fermentation, &c., and in the present case, as for ordinary beer, a very good beer-yeast is also obtained.

I claim—

1. The above-described method of transforming the synanthrose and inuline contained in the juice of Jerusalem artichoke into levulose by the application of an acid at a temperature of about 100° centigrade, and either in open air or under pressure, substantially as set forth.

2. The application and use of levulose in the manufacture of good alcohol by distillation, as above specified.

3. The application and use of levulose in the manufacture of levulose sirup, substantially as above set forth.

4. The application and use of levulose in the manufacture of a special beer, whatever may be the method of treatment employed, substantially as above set forth.

5. As new products of manufacture, levulose beer and hygienic beverage, which has heretofore never been obtained.

The foregoing specification of my improved method of transforming Jerusalem-artichoke juice into levulose and applying the said product signed by me this 18th day of July, 1884.

EDMOND LOUIS JOSEPH BONIFACE.

Witnesses:
ROBT. M. HOOPER,
ALBERT MOREAU.